United States Patent [19]
Tomabechi et al.

[11] 4,346,415
[45] Aug. 24, 1982

[54] CASSETTE TAPE RECORDER

[75] Inventors: Hideo Tomabechi, Hachioji; Hazime Osada, Fuchu; Akira Osanai, Hachioji, all of Japan

[73] Assignee: Olympus Optical Co., Ltd., Tokyo, Japan

[21] Appl. No.: 156,579

[22] Filed: Jun. 5, 1980

[30] Foreign Application Priority Data

Jun. 13, 1979 [JP] Japan .................................. 54-74488

[51] Int. Cl.³ .......................... G11B 15/29; G11B 5/54
[52] U.S. Cl. ................................... 360/105; 360/96.2; 242/199
[58] Field of Search ...................... 360/96.2, 96.4, 105, 360/130.21; 242/199, 201

[56] References Cited

U.S. PATENT DOCUMENTS

| 3,869,723 | 3/1975 | Yoshida | 360/96.2 |
| 3,881,187 | 4/1975 | Nakamichi | 360/105 |
| 3,936,877 | 2/1976 | Maruyama et al. | 360/96.2 X |
| 4,046,334 | 9/1977 | Kato et al. | 242/201 |
| 4,159,492 | 6/1979 | Ban et al. | 360/74.1 |

FOREIGN PATENT DOCUMENTS 2058506 6/1971 Fed. Rep. of Germany .
1333416 10/1973 United Kingdom .

Primary Examiner—John H. Wolff
Attorney, Agent, or Firm—Frishauf, Holtz, Goodman and Woodward

[57] ABSTRACT

A cassette tape recorder used with a tape cassette loaded therein comprises a pair of capstans, a motor, a power transmission mechanism, a first and a second magnetic head assembly, a moving mechanism and a magnetic head assembly operation switching circuit. The motor rotates selectively in one or the other direction at the same constant speed and with the same characteristics. The transmission mechanism is coupled to the capstans and to the motor for transmitting the rotation of the motor to the capstans to cause simultaneous rotation of the capstans in one or the other direction at the same constant speed. The first and second assemblies move between a first position in contact with the tape in the loaded tape cassette and a second position spaced apart from the tape. In the first position, the first assembly can record magnetic signals in some track of the tape driven in one direction or reproduce magnetic signals from the track, and the second assembly can record magnetic signals in other track of the tape driven in the other direction or reproduce magnetic signals from the track. The moving mechanism moves the two assemblies simultaneously and in the same direction. The circuit electrically selects and renders operative the first assembly when the tape is driven in one direction and selects and renders operative the second assembly when the tape is driven in the other direction.

4 Claims, 4 Drawing Figures

4,346,415

CASSETTE TAPE RECORDER

BACKGROUND OF THE INVENTION

This invention relates to cassette tape recorder and, more particularly, to a cassette tape recorder of a one-motor dual-capstan type, in which two capstans are provided and simultaneously driven by a single motor for driving a magnetic recording tape accommodated in a tape cassette in one or the other direction at a constant speed, and also in which magnetic signals can be recorded on or reproduced from the magnetic recording tape when the tape is being driven in one or the other direction at the constant speed.

The prior-art cassette tape recorder of the aforementioned type is provided with two magnetic head assemblies, each of which has a magnetic head for both recording and playback and a magnetic head for erasing or has a magnetic head for recording, a magnetic head for playback and a magnetic head for erasing. These two magnetic head assemblies are electrically connected such that when current is supplied to either one of them the other receives a supply of current. Also, they can be moved independently of each other between a first position, in which they are in contact with a magnetic recording tape, and a second position, in which they are spaced apart from the tape. When the constant driving of the tape in one direction is caused, only one of the magnetic head assemblies is brought from the second position to the first position for recording magnetic signals in some track or tracks of the tape or reproducing magnetic signals from that track or tracks. When the constant driving of the tape in the other direction is caused, the other magnetic head assembly is brought from the second position to the first position for recording magnetic signals in other track or tracks of the tape or reproducing magnetic signals from that other track or tracks. In neither of these cases, are the two magnetic head assemblies simultaneously moved from the second to the first position or simultaneously held in the first position.

The movement of one or the other of the magnetic head assemblies between the first position and the second position is carried out by an operation switching mechanism having a mechanically operable construction. This operation switching mechanism is complicated in construction and has a comparatively large number of movable parts, so that its assembly and maintenance are cumbersome. Besides, each one of various component parts of the operation switching mechanism needs comparatively large distance (hereinafter referred to as an operation distance) to fulfil their respective functions. Thus, a comparatively large space is necessary for installing the operation switching mechanism. This is a drawback from the standpoint of miniaturization of the cassette tape recorder of the afore-mentioned type.

SUMMARY OF THE INVENTION

An object of the invention is to provide a cassette tape recorder provided with an operation switching mechanism, which requires a comparatively small space for its installation and thus permits miniaturization of the cassette tape recorder of the afore-mentioned type while having a comparatively small number of movable parts so that its assembly and maintenance are easy.

DESCRIPTION OF THE PREFERRED EMBODIMENTS

Figure 1:
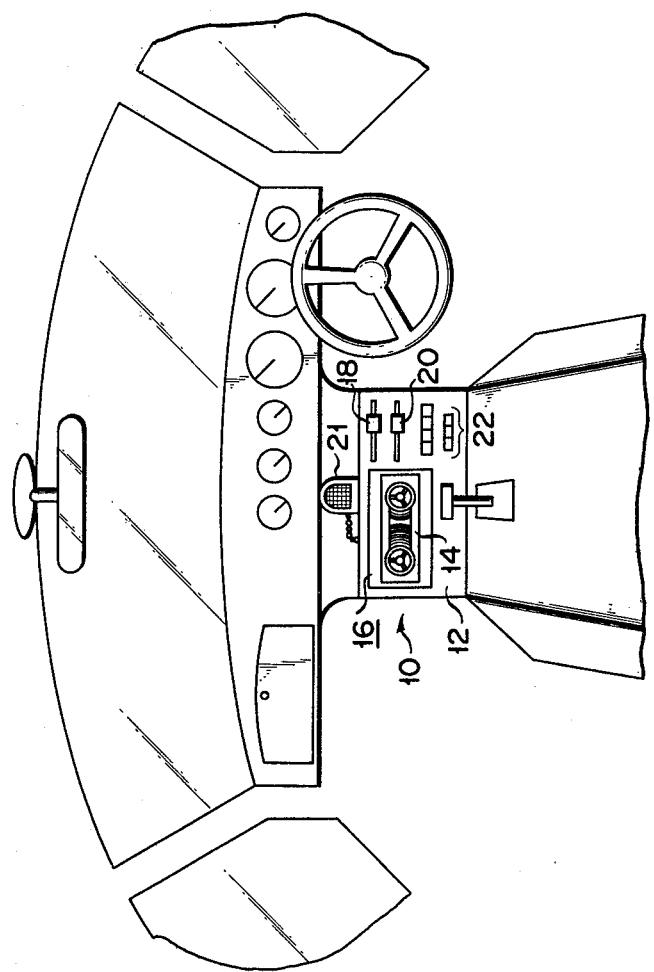
FIG. 1 is a front elevational view showing an embodiment of the cassette tape recorder according to the invention installed as a car stereo.

FIG. 1 shows an embodiment of the cassette tape recorder according to the invention. In this embodiment, the cassette tape recorder, designated at 10, is provided as a car stereo in a center console box 12 in an automobile. It is provided with a tape cassette loading section 16, in which a tape cassette 14 is loaded, a volume control knob 18 for the volume control of sound produced from a pair of loudspeakers (not shown), a balance knob 20 for adjusting the balance of the levels of the sound produced from the pair of loudspeakers, a microphone 21 and a plurality of button switches 22.

The button switches 22 consist of an eject switch for ejecting the tape cassette 14 from the tape cassette loading section 16, a forward play switch for producing a forward play signal permitting the reproduction of magnetic signals from a magnetic recording tape accommodated in the cassette 14 with the tape driven in one predetermined direction at a constant speed, a reverse play switch for producing a reverse play signal permitting the reproduction of magnetic signals from the tape with the tape driven in the other direction at the constant speed, a stop switch for producing a stop signal to stop the tape in the tape cassette 14, a fast forward switch for producing a fast forward signal to drive the tape in the tape cassette 14 in the afore-mentioned predetermined direction at a comparatively high speed, a rewind switch for producing a rewind signal to drive the tape in the tape cassette 14 in the afore-mentioned other direction at a comparatively high speed and a record switch for producing a record signal permitting the recording of magnetic signals on the magnetic recording tape when that record switch is depressed together with the forward or reverse play switch.

Figure 2:
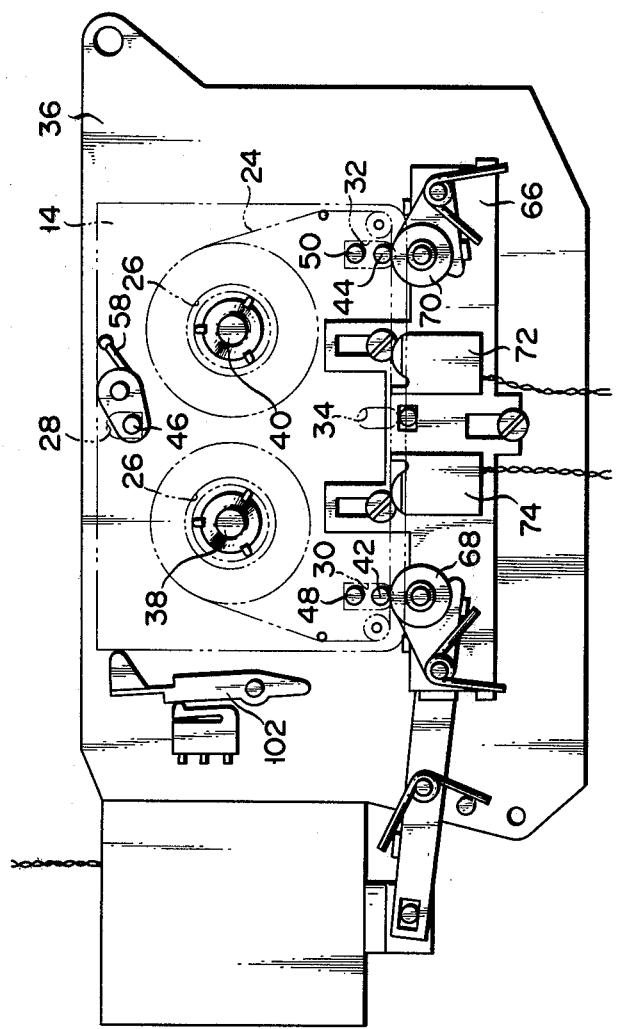
FIG. 2 is a front elevational view of the main portion of the same embodiment with first and second magnetic head assemblies thereof in a second position.

FIG. 2 shows the main portion of the cassette tape recorder 10, which is concealed by the central console box 12 and not shown in FIG. 1. As indicated by two-dot chain lines in FIG. 2, the tape cassette 14 containing a roll of magnetic recording tape (not shown) has a pair of openings 26 and four elongated holes 28, 30, 32 and 34 at its front and rear walls respectively. The openings 26 are formed in the central portion of the cassette 14, and are for inserting reel-driving shafts provided in a cassette tape recorder. The first to third elongated holes 28, 30 and 32 are formed respectively in the upper-middle, lower-left and lower-right portions of the cassette 14. These holes are for inserting cassette-positioning pins provided in the cassette tape recorder. The fourth elongated hole 34 is formed in the lower-middle portion of the cassette 14. The hole 34 is for inserting a capstan if the cassette 14 is applied for another type of cassette tape recorder.

The lower side wall of the cassette 14 has windows (not shown) for inserting a pinch roller and a magnetic head provided in the cassette tape recorder. On the left and right side walls of the cassette 14 there are provided two removable lugs (not shown) for preventing an accidental erasure of magnetic signals recorded in advance in the magnetic tape 24. The cassette is a small-sized one of known type which is called "a microcassette", and is used for a cassette tape recorder which can be put into the breast pocket of a man's jacket.

At a rear side of the cassette 14 a chassis 36 of the cassette tape recorder 10 is located. The chassis 36 is a plate which extends in a vertical direction. It is parallel to the rear wall of the cassette 14 and serves as a base plate of the tape cassette loading section 16. To the chassis 36 a pair of reel-driving shafts 38, 40, first and second capstans 42 and 44 are rotatably mounted. All of them project forwardly and are perpendicular to the chassis 36. The reel-driving shafts 38, 40 are inserted into a pair of openings 26 as shown in FIG. 2, and the first capstan 42 is inserted into the second elongated hole 30, and the second capstan 44 is inserted into the third elongated hole 32. On the chassis 36 first to third cassette-positioning pins 46, 48 and 50 are mounted. These cassette-positioning pins 46, 48 and 50 project forwardly and are perpendicular to the chassis 36. The second cassette-positioning pin 48 is planted on a front surface of the chassis 36 right over the first capstan 42, and is inserted into the second elongated hole 30. The third cassette-positioning pin 50 is planted on the front surface of the chassis 36 right over the second capstan 44, and is inserted into the third elongated hole 32.

Figure 3:
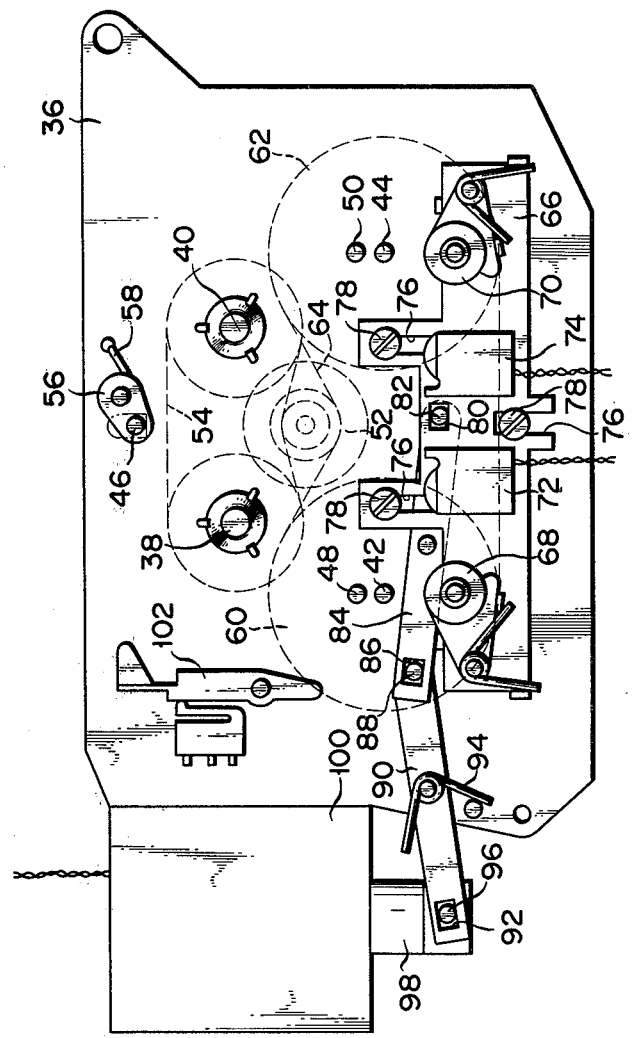
FIG. 3 is a front elevational view of the main portion of the same embodiment with first and second magnetic head assemblies thereof in a first position.

As shown in FIG. 3, a motor 52 is secured to a rear surface of the chassis 36. The motor 52 can rotate both in one and the other directions at the same constant speed with the same characteristics. To this motor 52 the reel-driving shafts 38 and 40 are connected by means of a belt 54. In this embodiment the belt 54 is a power transmission mechanism. Therefore shafts 38 and 40 can be rotated both in one and the other directions at the same constant speed by the motor 52. A plate 56 is located parallel to the front surface of the chassis 36, and is rotatably connected at its right end portion to the chassis 36 by a shaft (not shown) perpendicular to the front surface of the chassis 36. To the left end portion of the front surface of the plate 56 the first cassette-positioning pin 46 is secured to extend forwardly. The first cassette-positioning pin 46 is perpendicular to the chassis 36. A rotation control pin (not shown) protrudes from the left end portion of the rear surface of the plate 56 and extends through an elongated hole which is formed in the chassis 36 and which extends in vertical direction. The rotation control pin is coaxial with the first cassette-positioning pin 46, and the elongated hole is longer than the first elongated hole 28 of the cassette 14. When the cassette 14 is left from the cassette tape recorder 10, the rotation control pin can move for a distance longer than the distance defined by the first elongated hole 28 as the plate 56 is rotated parallel with the front surface of the chassis 36. The plate 56 is urged always to rotate counterclockwise by a torsion coil spring 58, a portion of which is shown in FIGS. 2 and 3. The spring 58 is wound around the shaft for rotation of the plate 56 so that it is made smaller in size than otherwise.

As illustrated in FIG. 3, in the back side of the chassis 36 the first and second capstans 42, and 44 are secured respectively to flywheels 60 and 62 which are driven by the motor 52 by means of a belt 64. Thus, both capstans 42 and 44 can be rotated both in a counterclockwise and a clockwise direction at the same constant speed. In this embodiment, the belt 64 is a power transmission mechanism for transmitting the rotation of the motor 52 to a pair of reel shafts 38 and 40.

As shown in FIG. 3, a plate-like shaped movable member 66 is provided in front of the chassis 36 and extending parallel to the front surface of the chassis 36. As shown in FIG. 3, a pair of pinch rollers 68 and 70 are projecting from the front surface of the movable member 66 perpendicular thereto, and first and second magnetic head assemblies 72 and 74 are mounted on the front surface of the movable member 66. In this embodiment, each of the first and second magnetic head assemblies 72 and 74 consists of a magnetic head for both recording and playback and a magnetic head for erasing. As illustrated in FIG. 3 the rollers 68 and 70 are located right under the first capstan 42 and the second capstan 44, respectively. The movable member 66 has three elongated guide holes 76 extending in vertical direction. Three pins 78 fixed to the front surface of the chassis 36 are inserted in the guide holes 76. Therefore, the movable member 66 can be movable in a vertical direction. When the movable member 66 is moved up from the position shown in FIG. 3, the pinch roller 68 is inserted into the window (not shown) formed in the front wall of the cassette 14 and cooperates with the first capstan 42 to pinch the tape 24 contained in the cassette 14, and the pinch roller 70 is also inserted into the window and cooperates with the second capstan 44 to pinch the tape 24 as shown in FIG. 2. When the movable member 66 is moved down from the position shown in FIG. 3, a pair of pinch rollers 68 and 70 come out of contact with the tape 24.

As shown in FIG. 3, the first and second magnetic head assemblies 72 and 74 are located halfway between a pair of pinch rollers 68 and 70. When the movable member 66 is moved up from the position of FIG. 3, the upper portions of the first and second magnetic head assemblies 72 and 74 are inserted into the windows of the tape cassette 14 and come into contact with the magnetic tape 24 as shown in FIG. 2. When the movable member 66 moves down from the position of FIG. 2, the first and second magnetic head assemblies 72 and 74 come out of contact with the tape 24.

That is, the movable member 66 moves between a first position where the first and second magnetic head assemblies 72 and 74 contact with the tape 24 and a second position where the first and second magnetic head assemblies 72 and 74 are spaced apart from the tape 24.

As shown in FIG. 3, the movable member 66 has an opening 80 which is formed halfway between the first and second magnetic head assemblies 72 and 74. In the opening 80 there is inserted a pin 82 secured to the right end portion of a front surface of a first lever 84. The first lever 84 extends parallel to the front surface of the chassis 36 and is substantially horizontal. The first lever 84 has its middle portion pivotally fastened to the front surface of the chassis 36 and thus is rotatable in a hypothetical plane parallel to a locus of the movable member 66 between the first and second position. The left end portion of the first lever 84 has an opening 86. In this opening 86 there is inserted a pin 88 secured to the right end portion of a front surface of a second lever 90. Like the first lever 84, the second lever 90 extends parallel to the front surface of the chassis 36, is substantially horizontal, has its middle portion pivotally fastened to the front surface of the chassis 36, and is thus rotatable in a hypothetical plane parallel to a locus of the movable member 66 between the first and second position. The left end portion of the second lever 90 has an opening 92. The second lever 90 is urged by urging means, a torsion coil spring 94 in this embodiment, so as to rotate counterclockwise. In the opening 92 a pin 96 is inserted, which is secured to the lower end of a rod 98. The rod 98 is projecting downwardly from a plunger 100 fixed to the left end portion of the chassis 36. In this embodiment, the movable member 66, the first lever 84, the second lever 90 and the plunger 100 constitute a driving mechanism for driving the first and second magnetic head assemblies 72 and 74 between the first and second positions. Also in this embodiment, the first and second levers 84 and 90 constitute a coupling means for coupling the movable member 66 to the plunger 100.

When the plunger 100 is supplied with electric current, the rod 98 is pulled upwardly by a solenoid (not shown) disposed in a housing of the plunger 100. At the same time, the movable member 66 is moved up to the first position by the function of the first and second levers 84, 90. When the current supply to the plunger 72 is stopped, the rod 98 is pulled downwardly by the urging force of the torsion coil spring 94. At the same time, the movable member 66 is moved down to the second position by the function of the first and second levers 84, 90.

On the front surface of the chassis 36 a switch 102 is mounted, as shown in FIG. 3. It cooperates with the removable lugs of the tape cassette 14; that is, it is closed when it detects that the removable lugs of the cassette 14 are present.

Figure 4:
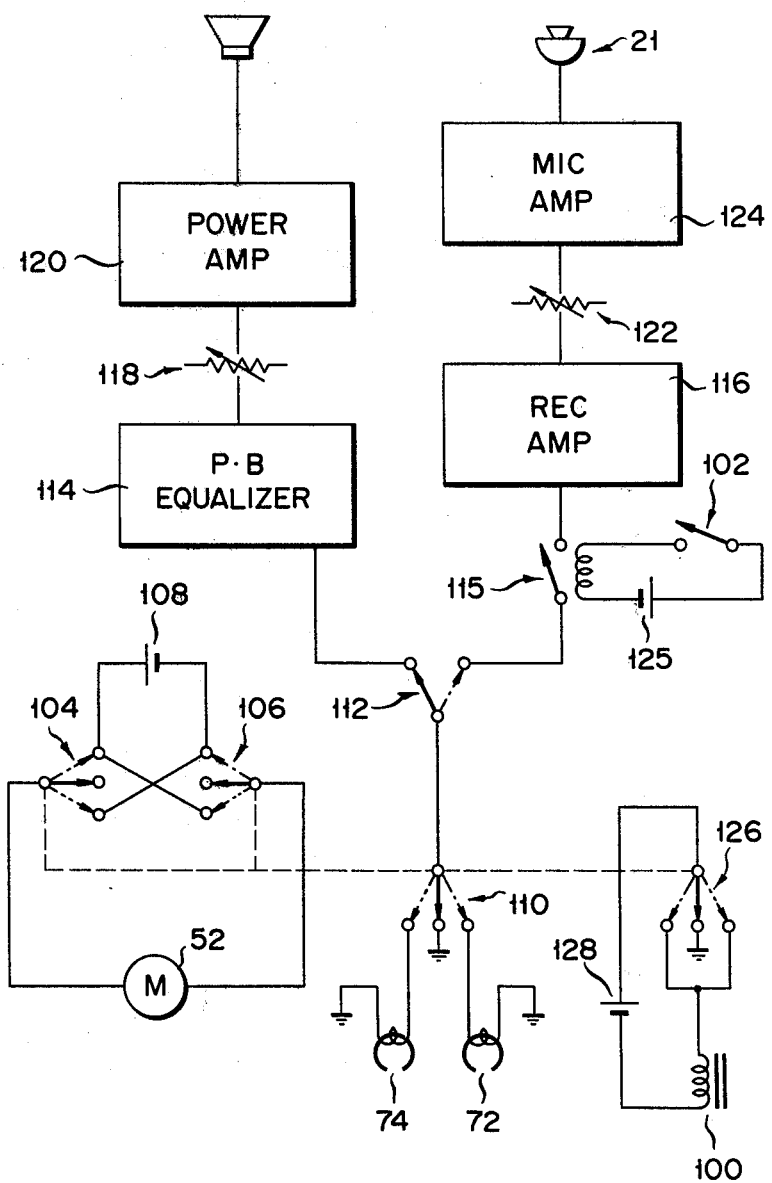
FIG. 4 is an electrical circuit of the same embodiment.

As shown in FIG. 4, a pair of terminals of the motor 52 are electrically connected to respective first and second three-position switches 104 and 106, which are in turn electrically connected to a direct current power supply 108 which is a battery of an automobile in the instant embodiment. The first and second three-position switches 104 and 106 are mechanically ganged to the afore-mentioned forward play switch, reverse play switch and stop switch. Normally, they are in a first position as shown by solid arrows in FIG. 4. At this time, the motor 52 is electrically separated from the power supply 108 and is not rotated. When the forward play switch is depressed, it transmits the afore-mentioned forward play signal, which is a mechanical signal, to the first and second three-position switches 104 and 106, whereby the first and second three-position switches 104 and 106 are brought to a second position as shown by one-dot chain line arrows in FIG. 4. At this time, as shown in FIG. 3, direct current is supplied from the power supply 108 to the motor 52, so that the motor 52 is rotated in the clockwise direction at a constant speed to cause rotation of the pair of capstans 42 and 44 and the pair of reel shafts 38 and 40 in the clockwise direction at a constant speed. When the reverse play switch is depressed, it transmits the afore-mentioned reverse play signal, which is a mechanical signal, to the first and second three-position switches 104 and 106, whereby the first and second three-position switches 104 and 106 are brought to a third position as shown by two-dot chain line arrows in FIG. 4. At this time, as shown in FIG. 3, direct current is supplied from the power supply 108 to the motor 52 in the opposite direction to that mentioned above, so that the motor 52 is rotated in the counterclockwise direction at the constant speed to cause rotation of the pair of capstans 42 and 44 and pair of reel shafts 38 and 40 in the counterclockwise direction at the constant speed. When the afore-mentioned stop switch is depressed after the depression of the forward or reverse play switch, it transmits the afore-mentioned stop signal, which is a mechanical signal, to the first and second three-position switches 104 and 106, whereby the first and second three-position switches 104 and 106, having been in the afore-mentioned second or third position, are brought to the afore-mentioned first position.

The first and second magnetic head assemblies 72 and 74, as shown in FIG. 4, are electrically connected to a third three-position switch 110, which is in turn electrically connected to a two-position switch 112. The two-position switch 112 is electrically connected to a playback equalizer 114 and also to a normally-open relay 115. The playback equalizer 114 is electrically connected through a variable resistor 118 for the volume control to a power amplifier 120, which is in turn electrically connected to the afore-mentioned pair of loudspeakers. The relay 115 is electrically connected to a recording amplifier 116, which is in turn electrically connected through a variable resistor 122 for the volume control to a microphone amplifier 124. The microphone amplifier 124 is electrically connected to the afore-mentioned microphone 21. The relay 115, as shown in FIG. 4, has a coil having one terminal connected to the cathode of a direct current power supply 125, which is in the instant embodiment a battery of an automobile. The other terminal of the coil of the relay 115 is electrically connected to the switch 102, which is in turn electrically connected to the anode of the power supply 125. When the switch 102 detects that the tape cassette 14 has removable lugs (not shown), it is closed to supply direct current to the coil of the relay 115 to close the switch section thereof.

The two-position switch 112 is mechanically ganged to the afore-mentioned record switch. Normally, it is in a first position as shown by a solid arrow in FIG. 4, i.e., electrically connected to the playback equalizer 114. When the record switch is depressed, it transmits the afore-mentioned record signal, which is a mechanical signal, to the two-position switch, whereby the two-position switch 112 is brought to a second position as shown by a one-dot chain line arrow in FIG. 4. At this time, the two-position switch 112 is electrically connected to the recording amplifier 116 if the switch section of the relay 115 is in the closed state.

The third three-position switch 110 is mechanically ganged to the forward and reverse play switches and stop switch. Normally, it is in a first position as shown by a solid line arrow in FIG. 4. At this time, the first and second magnetic head assemblies 72 and 74 are connected neither to the playback regulator 114 nor to the recording amplifier 116. When the forward play switch is depressed, the forward play switch transmits the mechanical forward play signal to the third three-position switch 110, whereby the third three-position switch 110 is brought to a second position as shown by a one-dot chain line arrow in FIG. 4. At this time, the first magnetic head assembly 72 is electrically connected to the playback equalizer 114. When the forward play switch and record switch are depressed at the same time, the magnetic head assembly 72 is electrically connected to the recording amplifier 116 if the switch section in the relay 115 is in the closed state. When the reverse play switch is depressed, it transmits the mechanical reverse play signal to the third three-position switch 110, whereby the third three-position switch 110 is brought to a third position as shown by a two-dot chain line arrow in FIG. 4. At this time, the second magnetic head assembly 74 is electrically connected to the playback equalizer 114. Further, when the reverse play switch and record switch are depressed at the same time, the second magnetic head assembly 74 is electrically connected to the recording amplifier 116 if the switch section of the relay 115 is in the closed state. When the stop switch is depressed after the depression of the forward or reverse play switch, the stop switch transmits the mechanical stop signal to the third three-position switch 110, whereby the third three-position switch 110 is brought to the afore-mentioned first position.

The afore-mentioned plunger solenoid, as designated at 100 in FIG. 4, is electrically connected at one of its pair of terminals to a fourth three-position switch 126, which is in turn electrically connected to the cathode of direct current power supply 128 which is a battery of an automobile in this embodiment. The other one of the pair of terminals of the solenoid 100 is electrically connected to the anode of the power supply 128.

The fourth three-position switch 126 is mechanically ganged to the reverse play switch and record switch. Normally, the fourth three-position switch 126 is held in a first position as shown by a solid line arrow in FIG. 4. At this time, no current is supplied from the power supply 128 to the plunger 100. In this state, the rod 98 of the plunger 100 is held in its lower set position by the biasing force of the torsion coil spring 94, so that the movable member 66 is held in the second position shown in FIG. 3. When the forward play switch is depressed, the forward play switch transmits the mechanical forward play signal to the fourth three-position switch 126, whereby the fourth three-position switch 126 is brought to a second position as shown by a one-dot chain line arrow in FIG. 4. When the reverse play switch is depressed, the reverse play switch transmits the mechanical reverse play signal to the fourth three-position switch 126, whereby the fourth three-position switch 126 is brought to a third position as shown by a two-dot chain line arrow in FIG. 4. When the fourth three-position switch 126 is brought to the second or third position, the rod 98 of the plunger 100 is moved upwards from the position shown in FIG. 3 to the position shown in FIG. 2 against the biasing force of the torsion coil spring 94.

When the stop switch is depressed after the depression of the forward or reverse play switch, the stop switch transmits the mechanical stop signal to the fourth three-position switch 126, whereby the fourth three-position switch 126 is brought to the first position.

As has been described in the foregoing, the cassette tape recorder according to the invention comprises a pair of capstans, a motor capable of being rotated selectively in one or the other direction at the same constant speed and with the same characteristics, a power transmission mechanism coupled to the pair of capstans and also to the motor for transmitting the rotation of the motor to cause simultaneous rotation of the pair of capstans in either one or the other direction at the same constant speed, thereby causing a magnetic recording tape accommodated in a tape cassette loaded in the cassette tape recorder to be driven in one or the other direction at the same constant speed, a first magnetic head assembly movable between a first position in contact with the magnetic recording tape in the loaded tape cassette and a second position spaced apart from the magnetic recording tape and capable, when in the first position, of recording magnetic signals in some track or tracks of the magnetic recording tape driven in the afore-said one direction or reproducing magnetic signals from that track or tracks, a second magnetic head assembly movable between the first and second positions and capable, when in the first position, of recording magnetic signals in other track or tracks than the afore-mentioned track of the magnetic recording tape or reproducing magnetic signals from the other tracks of the magnetic recording tape, a moving mechanism for moving the first and second magnetic head assemblies simultaneously and in the same direction, and a magnetic head assembly operation switching circuit means for electrically selecting and rendering operative the first magnetic head assembly when the tape is driven in one direction and electrically selecting and rendering operative the second magnetic head assembly when the tape is driven in the other direction. Thus, the space required for the installation of the magnetic head assembly operation switching mechanism is comparatively small, and it is possible to reduce the size of the cassette tape recorder. In addition, since the number of movable parts involved is reduced, the construction can be simplified and readily assembled and maintained.

Also, in the above embodiment of the invention, the moving mechanism includes a movable member carrying the first and second magnetic head assemblies secured thereto and movable between a first position to simultaneously hold the first and second magnetic head assemblies in the first position and a second position to simultaneously hold the first and second magnetic head assemblies in the second position, a solenoid, and a coupling means coupled to the movable member and also to the solenoid and capable of causing the movement of the movable member between the first and second positions thereof in accordance with the operation of the solenoid. Thus, the moving mechanism can be electrically controlled, so that it may have a simple and compact construction compared to the case of a mechanism which is mechanically controlled.

Further, in the above embodiment of the invention, the coupling means has a lever pivotable in a plane parallel to the plane of movement of the movable member. Thus, it is possible to reduce the distance of movement, particularly the distance in the vertical direction, required for effecting the function of the coupling means. This permits the reduction of the size, particularly the thickness dimension, of the cassette tape recorder.

Still further, the first and second magnetic head assemblies each include a magnetic head both for recording and playback and a magnetic head for erasing. Thus, it is possible to make compact the first and second magnetic head assemblies.

Still further, in the above embodiment of the invention, the cassette tape recorder further comprises a pair of reel shafts and a power transmission mechanism coupled to the pair of reel shafts and also to the motor such that the pair of reel shafts can be simultaneously rotated in one or the other direction from the motor through the power transmission mechanism. Thus, the construction of the tape cassette can be made compact compared to the case where the pair of reel shafts are respectively driven from separate motors.

The above embodiment of the invention is given for the purpose of illustration only and is by no means limitative, and various changes and modification in technical details can be made without departing from the scope and spirit of the invention. For example, each of two magnetic head assemblies may be constituted by a magnetic head for recording settled independently, a magnetic head for playback settled independently and a magnetic head for erasing settled independently. Each of two magnetic head assemblies may also be constituted by a magnetic head for both recording and playback settled independently and a magnetic head for erasing settled independently.

What we claim is:

1. A cassette tape recorder for use with a tape cassette loaded therein, said tape cassette containing magnetic recording tape, which comprises:

a pair of capstans;

a motor capable of being rotated selectively in one or the other direction at the same constant speed and with the same characteristics;

a power transmission mechanism coupled to said pair of capstans and also to said motor for transmitting the rotation of said motor to at least one of said pair of capstans to cause rotation of at least one of said pair of capstans in either one or the other direction, thereby causing a magnetic recording tape accommodated in a loaded tape cassette to be driven in one or the other direction;

a first magnetic head assembly including at least recording and playback magnetic heads, and having tape guide means for defining a position of the tape in a direction perpendicular to the tape transporting direction, and movable between a first position in which the recording and the playback magnetic heads and the tape guide means contact with a magnetic recording tape in a loaded tape cassette and the magnetic head assembly capable of recording tape driven in said one direction or reproducing magnetic signals from said at least one track and a second position in which the first magnetic head assembly is spaced apart from said magnetic recording tape;

a second magnetic head assembly including at least recording and playback magnet heads, and having tape guide means for defining a position of the tape in a direction perpendicular to the tape transporting direction, and movable between a first position in which the recording and the playback magnetic heads and the tape guide means of said second magnetic head assembly contact with magnetic recording tape in a loaded tape cassette and the magnetic head assembly capable of recording magnetic signals in the other track or tracks than said at least one track of said magnetic recording tape driven in said other direction or reproducing magnetic signals from said other track or tracks and a second position in which the second magnetic head assembly is spaced from said magnetic recording tape;

a moving mechanism for moving said first and second magnetic head assemblies simultaneously and in the same direction; and a magnetic head assembly operation switching circuit means for electrically selecting and rendering operative said first magnetic head assembly when said magnetic recording tape is driven in one direction and electrically selecting and rendering operative said second magnetic head assembly when said magnetic recording tape is driven in said other direction;

said second magnetic head assembly being arranged such that it is on the upstream side of the first magnetic head assembly when the magnetic tape is driven in said one direction and it is on the downstream side of the first magnetic head assembly when the magnetic tape is driven in said other direction.

2. The cassette tape recorder of claim 1, wherein said moving mechanism includes:

a movable member, said first and second magnetic head assemblies being secured to said movable member, said movable member being movable between a first position thereof to simultaneously hold said first and second magnetic head assemblies in their said first position, and a second position thereof to simultaneously hold said first and second magnetic head assemblies in their said second position;

a solenoid; and a coupling means coupled to said movable member and to said solenoid for causing said movable member to move between said first and second positions thereof in accordance with the operation of said solenoid.

3. The cassette tape recorder of claim 2, wherein said coupling means includes a lever pivotable in a plane parallel to the plane of movement of said movable member.

4. The cassette tape recorder of any one of claims 1, 2 or 3, wherein said first and second magnetic head assemblies each include a magnetic head for both recording and playback and a magnetic head for erasing.

* * * * *